US012183981B2

(12) United States Patent
Chieh

(10) Patent No.: US 12,183,981 B2
(45) Date of Patent: Dec. 31, 2024

(54) GRATING LOBE CANCELLATION

(71) Applicant: Naval Information Warfare Center Pacific, San Diego, CA (US)

(72) Inventor: Jia-Chi Samuel Chieh, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 18/366,863

(22) Filed: Aug. 8, 2023

(65) Prior Publication Data

US 2024/0063556 A1 Feb. 22, 2024

Related U.S. Application Data

(62) Division of application No. 17/868,952, filed on Jul. 20, 2022, now Pat. No. 11,791,570.

(51) Int. Cl.

| | |
|---|---|
| ***H01Q 21/10*** | (2006.01) |
| ***H01P 5/16*** | (2006.01) |
| ***H01Q 9/04*** | (2006.01) |
| ***H01Q 21/29*** | (2006.01) |

(52) U.S. Cl.

CPC ............. *H01Q 21/293* (2013.01); *H01P 5/16* (2013.01); *H01Q 9/0478* (2013.01); *H01Q 21/10* (2013.01)

(58) Field of Classification Search

CPC .... H01Q 21/293; H01Q 9/0478; H01Q 21/10; H01P 5/16

See application file for complete search history.

(56) References Cited

U.S. PATENT DOCUMENTS 4,041,501 A * 8/1977 Frazita .................. H01Q 21/06 342/373
6,317,094 B1 * 11/2001 Wu .................... H01Q 21/0087 343/770

(Continued)

OTHER PUBLICATIONS

Iqbal et al. (IEEE Transactions on Antennas and Propagation, vol. 66, No. 12, pp. 6965-6974, Dec. 2018) (Year: 2018).*

(Continued)

*Primary Examiner* — Hai V Tran
*Assistant Examiner* — Jordan E. DeWitt
(74) *Attorney, Agent, or Firm* — Naval Information Warfare Center, Pacific; Kyle Eppele

(57) ABSTRACT

A method for radiating a co-located antenna including radiating the co-located antenna using a dual mode, where the co-located antenna has an inter-element spacing of about 1λ and the dual mode includes a $TM_{11}$ mode and a $TM_{21}$ mode. The $TM_{11}$ mode is radiated to generate a $TM_{11}$ far field pattern, where the $TM_{11}$ mode has a broadside pattern characterized with a beam peak at broadside and the $TM_{11}$ mode produces grating lobes in addition to the beam peak at broadside. The $TM_{21}$ mode is radiated to generate a $TM_{21}$ far field pattern orthogonal to the $TM_{11}$ far field pattern, thereby causing the $TM_{21}$ mode to produce a null at broadside to suppress the grating lobes produced by the $TM_{11}$ mode.

8 Claims, 12 Drawing Sheets

(56) References Cited

U.S. PATENT DOCUMENTS

| | | | | |
|---|---|---|---|---|
| 2010/0126010 | A1* | 5/2010 | Puzella | H05K 1/0251 333/33 |
| 2011/0090981 | A1* | 4/2011 | Lindgren | H04B 7/0689 375/267 |
| 2014/0114190 | A1* | 4/2014 | Chiang | A61B 8/4405 600/440 |
| 2019/0115459 | A1* | 4/2019 | Kim | H01L 29/1004 |

OTHER PUBLICATIONS

C. Laffey, S. K. Sharma, R. Farkouh and J.-C. S. Chieh, "Dual Mode Phased Array Antenna using Silicon RFICs based Integrated Beamforming Network," 2021 IEEE Space Hardware and Radio Conference (SHaRC), 2021, pp. 35-38, doi: 10.1109/SHaRC51853.2021.9375879.

Z. Iqbal and M. Pour, "Grating Lobe Mitigation in Scanning Planar Phased Array Antennas," 2019 IEEE International Symposium on Phased Array System & Technology (PAST), 2019, pp. 1-3.

Z. Iqbal, T. H. Mitha and M. Pour, "Grating Lobe Reductions in a Planar Hexagonal Scanning Array with Large Element Spacing," 2020 IEEE International Symposium on Antennas and Propagation and North American Radio Science Meeting, 2020, pp. 15-16.

Z. Iqbal and M. Pour, "Exploiting Higher Order Modes for Grating Lobe Reduction in Scanning Phased Array Antennas," in IEEE Transactions on Antennas and Propagation, vol. 67, No. 11, pp. 7144-7149, Nov. 2019.

* cited by examiner

GRATING LOBE CANCELLATION

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor. Licensing and technical inquiries may be directed to the Office of Research and Technical Applications, Naval Information Warfare Center Pacific, Code 72120, San Diego, CA, 92152; (619) 553-5118; ssc_pac_t2@navy.mil. Reference Navy Case Number 211703.

BACKGROUND

Phased array antennas are a computer controlled array of antennas that can create a beam of radio waves that are electronically steered without moving the antennas. Phased array antennas have become more widely used due, in part, to the ability to realize silicon (Si) or silicon germanium (SiGe) fully integrated beamformer chips with an operation up to 140 GHz. Phased array antennas have applications in broadcasting, radar, space probe communications, weather research, optics, satellite broadband transceivers, radio-frequency identification, human-machine interfaces, and radio astronomy.

DESCRIPTION OF THE DRAWINGS

Features and advantages of examples of the present disclosure will be apparent by reference to the following detailed description and drawings, in which like reference numerals correspond to similar, but in some instances, not identical, components. Reference numerals or features having a previously described function may or may not be described in connection with other drawings in which they appear.

DETAILED DESCRIPTION

The number of beamforming channels on a single chip is dependent on the frequency of operation and the lattice spacing of the array. As the frequency increases, the lattice spacing or the physical distance between antenna elements is reduced. When the lattice spacing (i.e., the inter-element spacing) is greater than 0.5λ, grating lobes are generated, which can reduce the effectiveness of the phased array antenna. High performance phased array antennas have traditionally been designed with an antenna lattice spacing of 0.5λ at the highest operating frequency to mitigate grating lobes when the antenna beam is scanned away from broadside. However, the 0.5λ, lattice spacing makes the phased array antennas expensive when using micro-electronic beamformers. As a result, only high performance phased array antennas with 0.5λ, lattice spacing use micro-electronic beamformers. In addition, the lattice spacing is so small that a design including a silicon beamformer chip and auxiliary compound semiconductor chips becomes unfeasible.

In the method herein, an antenna with an inter-element spacing of 1λ is used, which allows the incorporation of traditional, low cost microelectronic beamformers and techniques, such as multi-chip modules. The relaxed lattice spacing allows multiple ways to incorporate low cost micro-electronic beamformers. In addition, moving to a 1λ inter-element spacing increases the effective aperture, leading to higher antenna gain/noise temperature (G/T) and higher effective isotropic radiated power (EIRP) for the same number of antenna elements within the antenna. In one example, a dual mode co-located antenna may be used in a $TM_{11}$ mode and a $TM_{21}$ mode to cancel grating lobes generated on the broadside. In another example, a dual mode tapered slot antenna may be used in a common mode and differential mode to cancel grating lobes generated on the broadside. Each method is discussed in detail herein.

In one example, a method for radiating a co-located antenna includes radiating the co-located antenna using a dual mode, where the co-located antenna has an inter-element spacing of about 1λ and the dual mode includes a $TM_{11}$ mode and a $TM_{21}$ mode. The $TM_{11}$ mode is radiated to generate a $TM_{11}$ far field pattern, where the $TM_{11}$ mode has a broadside pattern characterized with a beam peak at broadside and the $TM_{11}$ mode produces grating lobes in addition to the beam peak at broadside. The $TM_{21}$ mode is radiated to generate a $TM_{21}$ far field pattern orthogonal to the $TM_{11}$ far field pattern, thereby causing the $TM_{21}$ mode to produce a null at broadside to suppress the grating lobes produced by the $TM_{11}$ mode.

Figure 1:
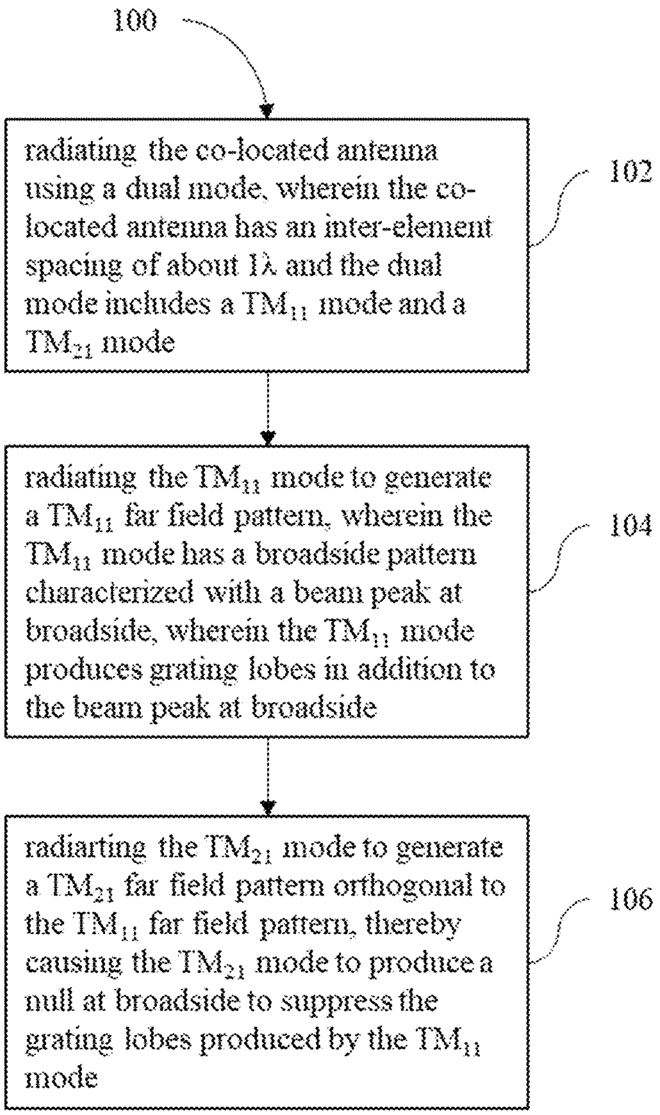
FIG. 1 is a flow diagram of an example of the method of radiating an antenna disclosed herein.

Referring now to FIG. 1, the method 100 includes 102 radiating the co-located antenna using a dual mode, where the co-located antenna has an inter-element spacing of about 1λ and the dual mode includes a $TM_{11}$ mode and a $TM_{21}$ mode. Because the co-located antenna has an inter-element spacing of about 1λ, grating-lobes are generated. However, $TM_{11}$ and $TM_{21}$ modes are orthogonal in nature and provide individual patterns that are directional ($TM_{11}$) and conical ($TM_{21}$) in coverage and can be described by Cos θ and Sin θ terms. As a result, the $TM_{21}$ mode suppresses the grating lobes generated by the $TM_{11}$ mode when radiating.

The co-located antenna may be any co-located antenna on a single metal layer capable of producing dual $TM_{11}$ and $TM_{21}$ modes. Some examples of the co-located antenna may be a phased array antenna, a 2D planar array, or a triangular lattice antenna. In another example, the phased array antenna may be a 16-element linear phased array antenna. In another example, the co-located antenna may be a phased array antenna, 2D planar array antenna, or triangular lattice antenna with one antenna being a ring patch antenna capable of producing the $TM_{11}$ mode and the other antenna being a circular patch antenna capable of producing $TM_{21}$ mode. The relaxed inter-element spacing of 1λ allows some examples of the antenna to include a SiGe beamformer integrated with a multi-chip module. The multi-chip module may be any chip on board multi-chip module on a ceramic substrate and connected together using gold wire bonds. An example includes silicon dies, silicon-germanium dies, and GaN/InP compound semiconductor dies on a ceramic carrier.

Figure 2:
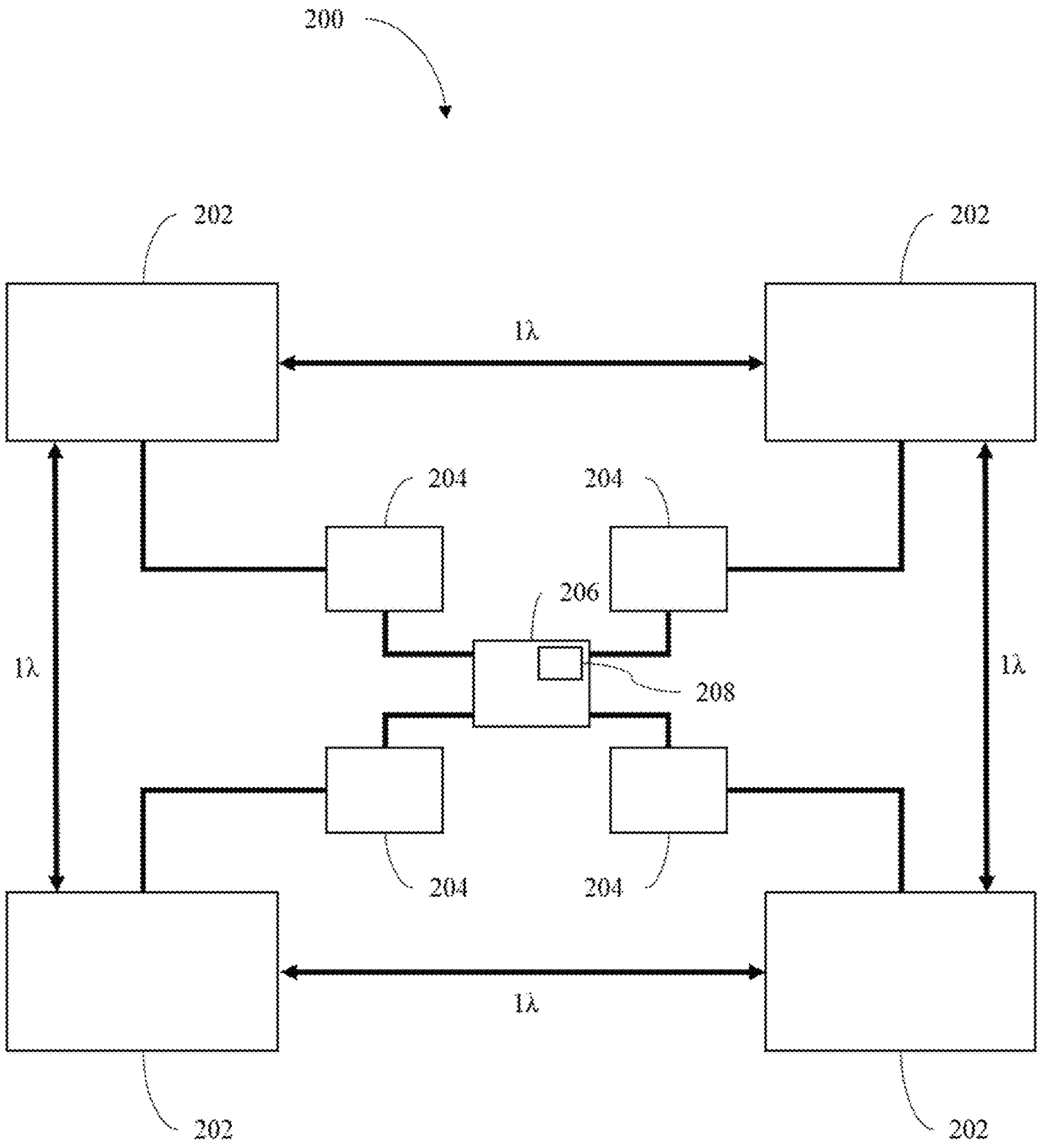
FIG. 2 is an example of the antenna with an inter-element spacing of 1λ.

An example of a co-located antenna 200 is shown in FIG. 2 with 12 inter-element spacing between each co-located antenna. The example in FIG. 2 has four times the area due to the inter-element spacing, which allows the addition of III-V components. In additional examples, the co-located antenna 200 further includes splitting an RF signal between all radio-frequency integrated circuits using a Wilkinson power divider (not shown in FIG. 2). The Wilkinson power divider includes a split between 1 to 48 radio-frequency integrated circuits. In other examples, the co-located antenna 200 includes III-V components (e.g., silicon CMOS, SiGe, GaAs, GaN, InP, etc.). For example, a high power amplifier 204, such as gallium nitride (GaN) high power amplifier, low noise amplifier 208, such as indium phosphate (InP) low noise amplifier, a beamformer 206, such as a silicon germanium (SiGe) beamformer, or a combination thereof may be included in the co-located antenna 200. The co-located antenna 200 in FIG. 2 includes four high power amplifiers 204, a low noise amplifier 208, and a beamformer 206. In this example, the co-located antenna includes four patch antennas 202 connected to the high power amplifier 204, the beamformer 206, and the low noise amplifier 208. The beamformer 206 has the low noise amplifier 208 built-in, which is depicted in FIG. 2.

Figure 3:
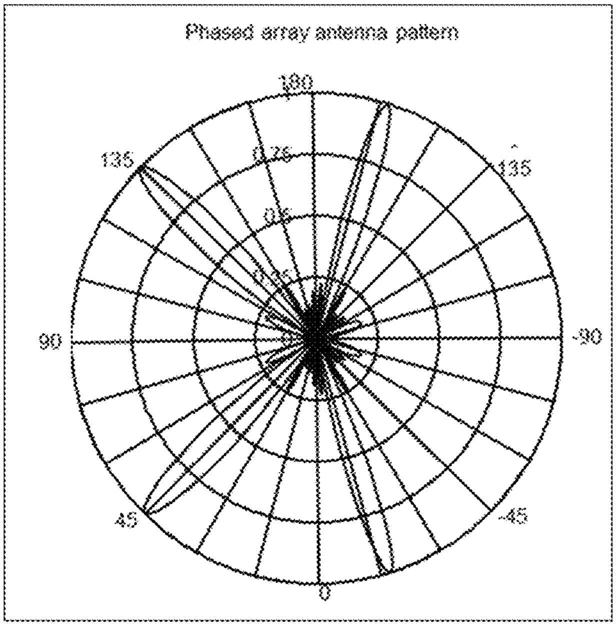
FIG. 3 is an example of a $TM_{11}$ mode phased array antenna pattern with a phased array antenna having 1λ inter-element spacing.

Referring back to FIG. 1, the method 100 includes 104 radiating the $TM_{11}$ mode to generate a $TM_{11}$ far field pattern, where the $TM_{11}$ mode has a broadside pattern characterized with a beam peak at broadside and the $TM_{11}$ mode produces grating lobes in addition to the beam peak at broadside. The dominant $TM_{11}$ mode excited in an array produces high gain and provides the main antenna beam, which can be steered by traditional methods or remain stationary while radiating. In an example, FIG. 3 shows an antenna pattern for an 8-element linear phased array with 5-bit of phase control and 1λ inter-element spacing, which shows the grating lobes that are produced by the $TM_{11}$ mode pattern.

Referring back to FIG. 1, the method 100 includes 106 radiating the $TM_{21}$ mode to generate a $TM_{21}$ far field pattern orthogonal to the $TM_{11}$ far field pattern, thereby causing the $TM_{21}$ mode to produce a null at broadside to suppress the grating lobes produced by the $TM_{11}$ mode. The $TM_{21}$ mode acts as an auxiliary antenna to produce the null at broadside, which can also be steered by traditional methods similar to the $TM_{11}$ mode. As such, the $TM_{21}$ mode is steered to where the grating lobes reside to cancel the grating lobes. In an example, the grating lobes are cancelled in an amount of equal to or less than 30 dB.

In one example, the grating lobes can be located and suppressed using a specific process. The process includes i) an identical amplitude and phase are applied to the $TM_{11}$ mode and the $TM_{21}$ mode; ii) the phase shift is adjusted until a null appears; iii) the $TM_{21}$ mode amplitude is adjusted by using 0.5 dB attenuation; and iv) repeating ii) and iii) until equal to or less than 30 dB of cancellation been achieved.

In another example, another method involves radiating a tapered slot antenna that includes radiating the tapered slot antenna using a dual mode, where the antenna has an inter-element spacing of about 1λ and the dual mode includes a differential mode and a common mode. The differential mode is radiated to generate a far field summation pattern, where the differential mode has a broadside pattern characterized with a beam peak at broadside and the differential mode produces grating lobes in addition to the beam peak at broadside. The common mode is radiated to generate a far field differential pattern orthogonal to the far field summation pattern, thereby causing the common mode to produce a null at broadside to suppress the grating lobes produced by the differential mode.

Figure 4:
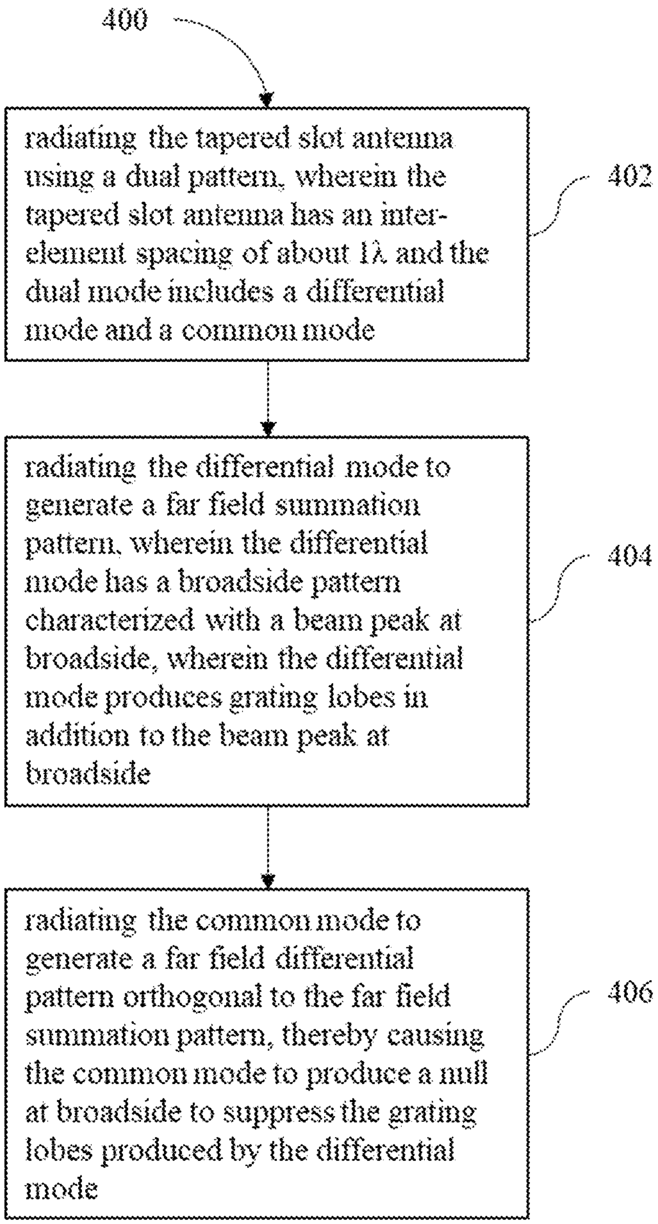
FIG. 4 is a flow diagram of another example of the method of radiating an antenna disclosed herein.

Referring now to FIG. 4, the method 400 includes 402 radiating the tapered slot antenna using a dual pattern, where the tapered slot antenna has an inter-element spacing of about 1λ and the dual mode includes a differential mode and a common mode. The tapered slot antenna is configured to have two feed ports. If the feed ports are excited in the differential mode, the modes are constructive and produce a directive beam pattern. If the feed ports are excited in the common mode, the modes are destructive and produce a null at broadside. The differential mode is the dominant mode, which produces the main beam, and the common mode is the auxiliary mode that produces the null. The tapered slot antenna may further include splitting an RF signal between all radio-frequency integrated circuits using a Wilkinson power divider. The Wilkinson power divider includes a split between 1 to 48 radio-frequency integrated circuits.

Figure 5:
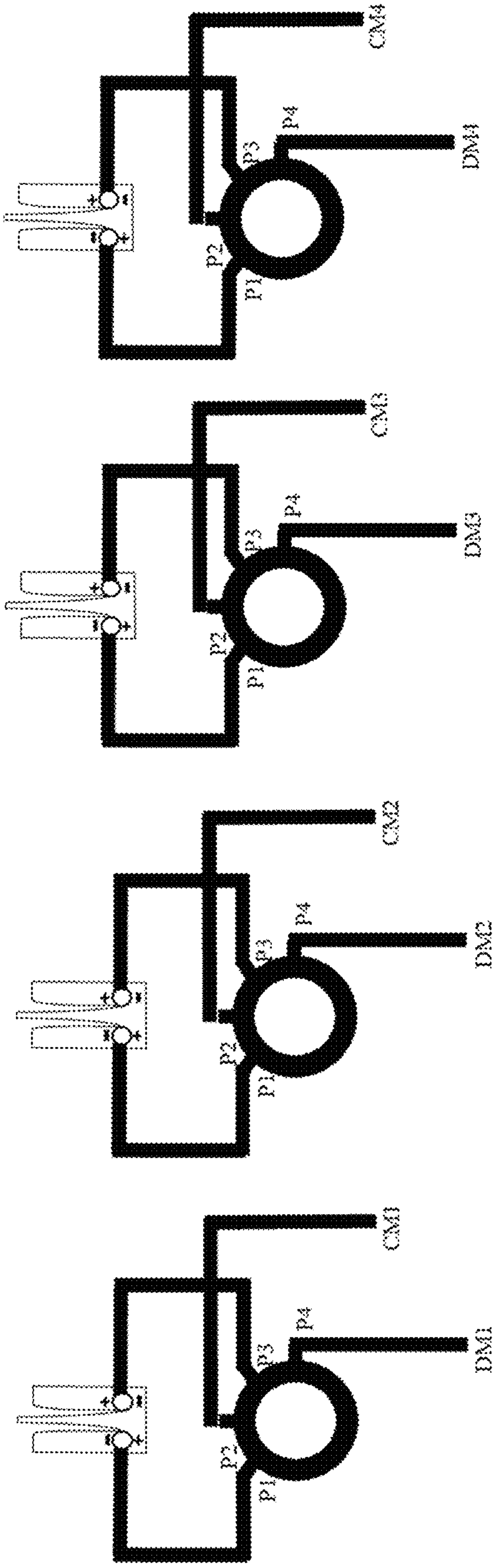
FIG. 5 is an example of a wideband tapered slot antenna with 1λ inter-element spacing.

An example of the tapered slot antenna is shown in FIG. 5. The tapered slot antenna has two feeds ports and a rat race coupler. The rat race coupler can be used to produce a single input port for the common mode and a single input port for the differential mode. In the rat race coupler, each port is separated by λ/4, or 90°. Port 1 and 3 of the rat race coupler are connected to the two tapered slot antenna feed ports. Port 2 of the rat race coupler becomes the common mode input for the antenna (i.e., CM1-CM4). Port 4 of the Rat Race coupler becomes the differential mode input for the antenna (i.e., DM1-DM4). The array of antenna elements are spaced 1λ apart. The common mode antenna feeds can be routed to a beamformer chipset to create the common mode beam. The differential mode antenna feeds can also be routed to the respective beamformer chipset to create the differential mode beam. Similar to the co-located antenna 200 discussed herein, the tapered slot antenna may also have the same III-V components previously disclosed herein.

Referring back to FIG. 4, the method 400 includes 404 radiating the differential mode to generate a far field summation pattern, where the differential mode has a broadside pattern characterized with a beam peak at broadside, where the differential mode produces grating lobes in addition to the beam peak at broadside. The differential mode is the dominant mode that produces the main beam, which as the differential mode is scanned broadside, grating lobes enter the visible space. The differential mode can be steered by traditional methods or remain stationary while radiating.

Referring back to FIG. 4, the method 400 includes 406 beaming the common mode to generate a far field differential pattern orthogonal to the far field summation pattern, thereby causing the common mode to produce a null at broadside to suppress the grating lobes produced by the differential mode. The common mode is the auxiliary mode, which produces the null at broadside. The auxiliary beam can be steered using traditional methods in the direction of the grating lobe to cancel out the grating lobe. In an example, the grating lobes are cancelled in an amount of equal to or less than 30 dB.

In one example, the grating lobes are suppressed using a specific process. The process includes i) an identical amplitude and phase are applied to the $TM_{11}$ mode and the $TM_{21}$ mode; ii) the phase shift is adjusted until a null appears; iii) the $TM_{21}$ mode amplitude is adjusted by using 0.5 dB attenuation; and iv) repeating ii) and iii) until equal to or less than 30 dB of cancellation been achieved.

An antenna system may be used when performing methods 100, 400 disclosed herein. The antenna system includes a multi-mode antenna, a beamformer, a low noise amplifier, and a high noise amplifier. The multi-mode antenna has an inter-element spacing of 1λ and can radiate in a dominant mode and an auxiliary mode. In one example, the multi-mode antenna is a co-located antenna, which is the same co-located antenna as previously described herein. When the co-located antenna is used in the antenna system, the multi-mode antenna has a dominant mode and auxiliary mode. The dominant mode is a $TM_{11}$ mode and the auxiliary mode is the $TM_{21}$ mode, which functions as previously described herein. In another example, the multi-mode antenna is a tapered slot antenna, which is the same tapered slot antenna as previously described herein. In this example, the dominant mode is a differential mode and the auxiliary mode is a common mode, which functions as previously described herein.

The antenna system may also include III-V components. Some examples of the III-V components include a high power amplifier, low noise amplifier, a beamformer, or a combination thereof. The high power amplifier, low noise amplifier, and the beamformer may be the same high power amplifier, low noise amplifier, and beamformer as previously described herein.

To further illustrate the present disclosure, examples are given herein. These examples are provided for illustrative purposes and are not to be construed as limiting the scope of the present disclosure.

EXAMPLES

Example 1: Single Element Dual Mode Antenna

A single element dual mode antenna was designed for use within an integrated flat panel linear phased array antenna. As a result, the simulation includes four of the five layers in the printed circuit board (PCB) stack up for proper accuracy. On top is the driven patch later, followed by a power supply and serial protocol interface (SPI) communication layer. Lastly, there is a bond ply spacing layer before an RF I/O (Input/Output) layer on the backside of the board. This RF layer will be simulated as a single layer. The patches are placed on 30 mil of Roger's 4350 ($\varepsilon_r$=3.66, tan δ=0.004) substrate.

Figure 6A:
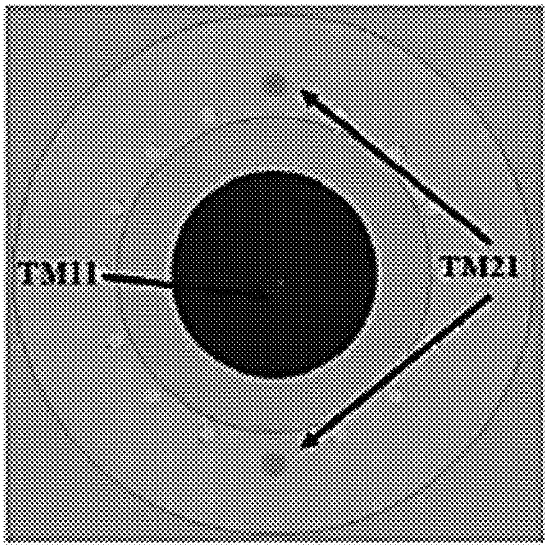
FIG. 6A-6C are a top view, perspective view, and side view, respectively, of examples of a dual mode concentric ring shorted patch antenna.
Figure 6B:
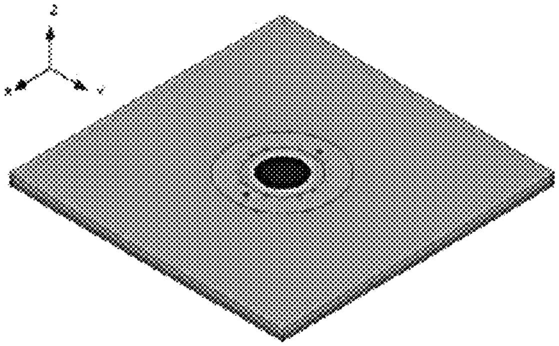
Figure 6C:

The single element dual mode antenna includes a $TM_{11}$ mode patch and a $TM_{21}$ mode patch. The $TM_{11}$ mode patch had a radius of 2.87 mm. The $TM_{21}$ mode patch had a radius of 7.28 mm with a cutout radius of 4.4 mm. The vias were each 10 mil in diameter, and were placed 4.8 mm from the center of the $TM_{11}$ patch. The feed location of the $TM_{11}$ mode patch was 0.44 mm from the center, and the feed point of the $TM_{21}$ mode patch is 0.9 mm from the interior edge. The single antenna element HFSS model is shown below in FIG. 6A-6C. FIG. 6A shows a top view of an example of the dual mode concentric ring shorted patch antenna. FIG. 6B shows a perspective view of an example the dual mode concentric ring shorted patch antenna. FIG. 6C shows a side view of an example the dual mode concentric ring shorted patch antenna.

Figure 7:
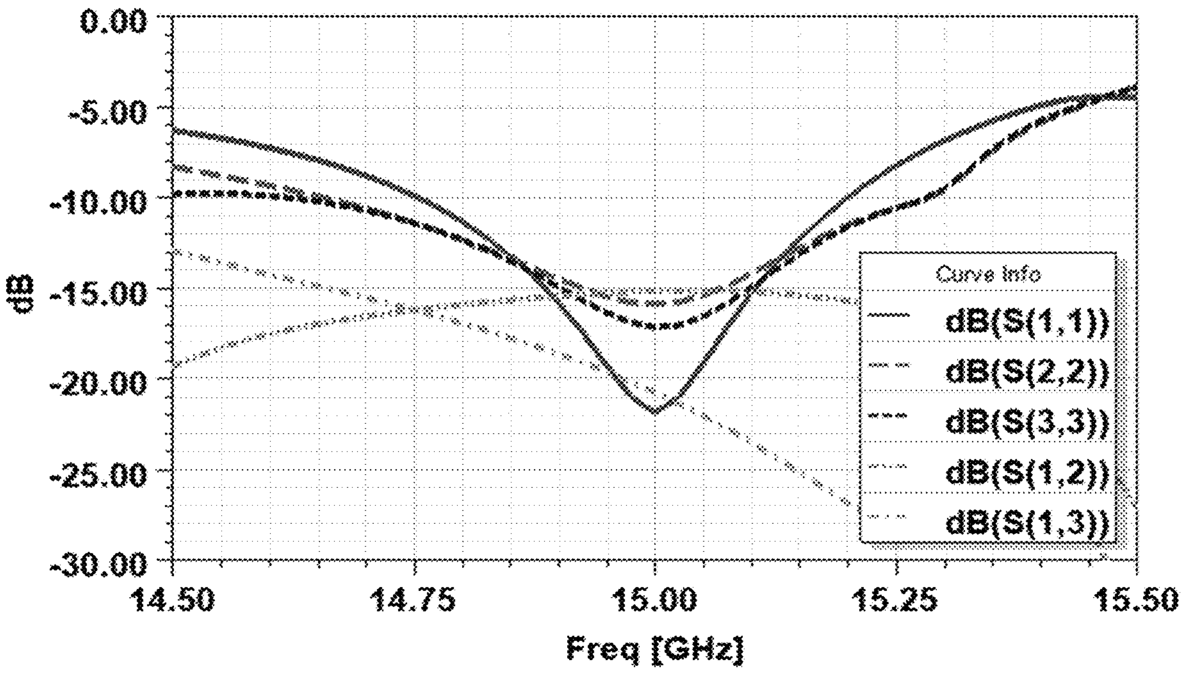
FIG. 7 is a plot of the frequency (X-axis, labeled "Freq [GHz]") vs. the decibels (Y-axis, labeled "dB") that shows the S-parameters of the dual mode single radiating element.
Figure 8:
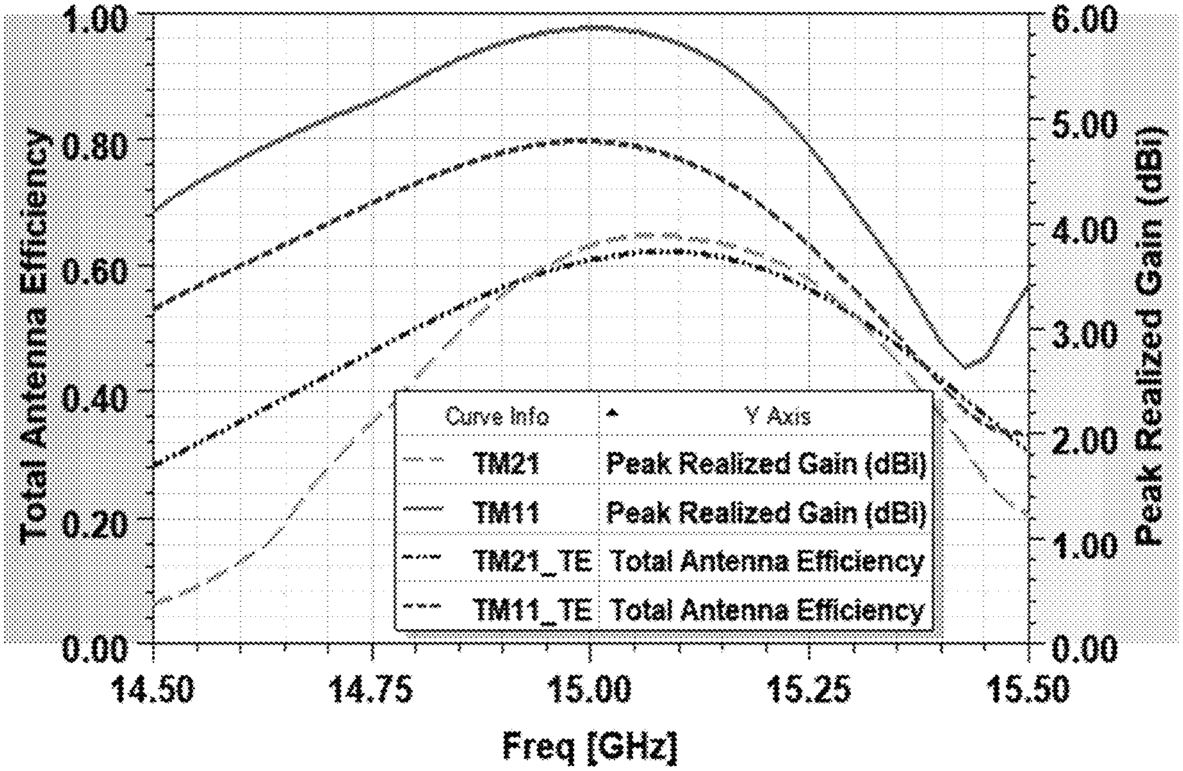
FIG. 8 is a plot of the frequency (X-axis, labeled "Freq [GHz]") vs. the total antenna efficiency (Y-axis, labeled "Total Antenna Efficiency") that shows the peak realized gain and the total antenna efficiency of the dual mode single radiating element.

The single element performed as expected with a $TM_{11}$ mode impedance matching ($S_{11}$≤−10 dB) bandwidth of 450 MHz while the $TM_{21}$ mode patch had a bandwidth of 630 MHz. The common matching bandwidth was 14.75 GHz to 15.2 GHz, which is shown in FIG. 7. Furthermore, the respective patches displayed consistent radiation patterns across their impedance matching bandwidth. The $TM_{11}$ mode patch had a total antenna efficiency above 70% for the entire bandwidth, but reached 80% at 15 GHz. This resulted in a $TM_{11}$ mode peak realized gain of 5.85 dBi at 15 GHz. The $TM_{21}$ mode patch had a total antenna efficiency above 40%, but reached 62% at 15 GHz. This resulted in $TM_{21}$ mode peak realized gain of 2 dBi at 14.75 GHz and 3.9 dBi at 15.1 GHz. Both the peak realized gain and total antenna efficiency can be seen in FIG. 8.

Figure 9A:
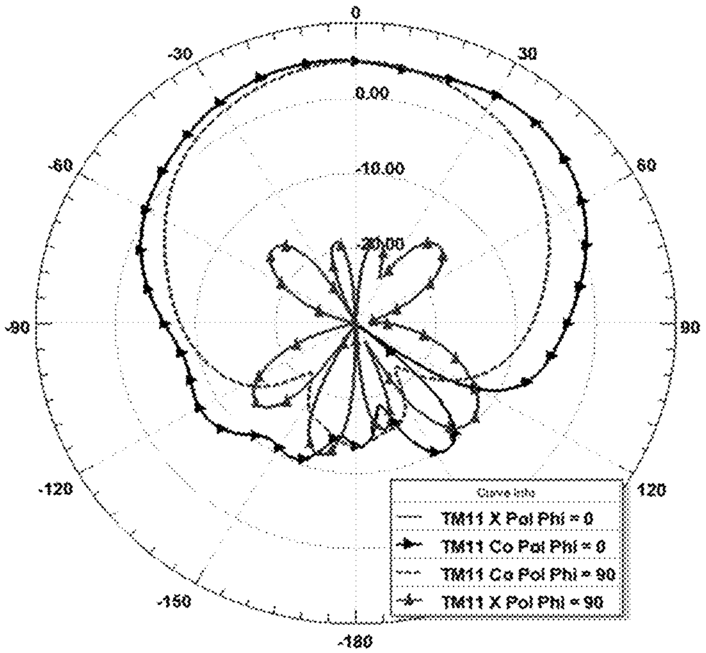
FIG. 9A-9B are a $TM_{11}$ mode and $TM_{21}$ mode radiation pattern, respectively, at the design frequency of $f_0$=15 GHz.
Figure 9B:
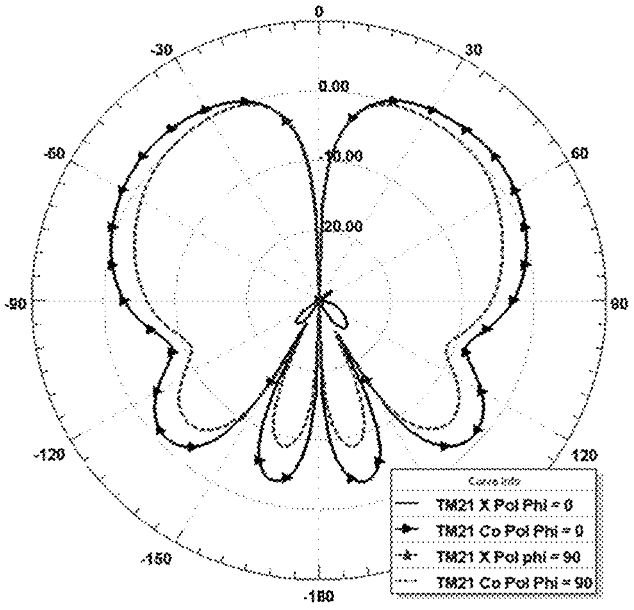

The $TM_{11}$ and $TM_{21}$ mode radiation patterns are shown at the design frequency of $f_0$=15 GHz in FIGS. 9A and 9B, respectively. The $TM_{11}$ mode patch had a gain of 5.85 dBi with a crosspolarization separation of 20 dB, while the $TM_{21}$ mode pattern had a peak gain of 3.8 dBi with a deep null at the broadside angle and cross-polarization separation of 25 dB.

Example 2: 16-Element Linear Phased Array Antenna

Figure 10A:
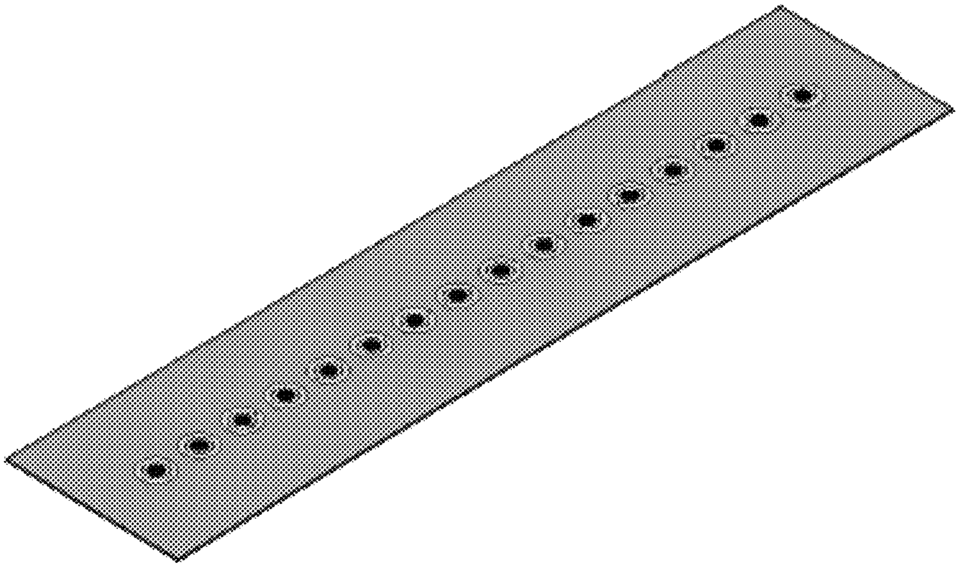
FIG. 10A-10B are examples of a perspective view and top view, respectively, of the 1×16 dual mode phased array antenna.
Figure 10B:
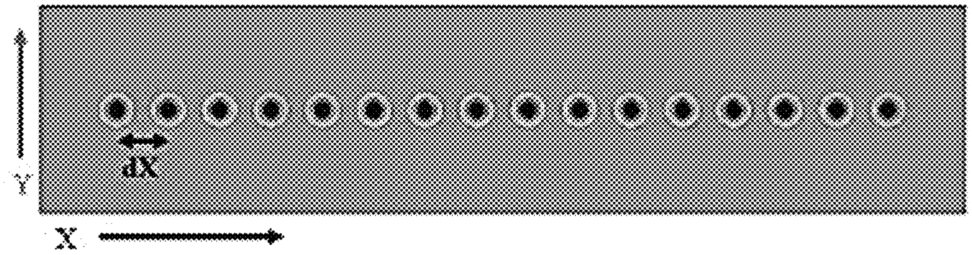

The 16-element dual mode linear phased array antenna is shown above in Fig. X. Perspective and Top views are shown in FIGS. 10A and 10B, respectively. The dual mode radiating elements are maintaining inter-element spacing of $d_x$=1λ. This allows additional PCB space on the backside of the array, which is the BFN side. This will result in grating lobe generation in the $TM_{11}$ mode radiation patterns, both broadside and scanned patterns, which we are canceling by suitably exciting the $TM_{21}$ mode radiation patterns as the auxiliary mode pattern.

The Anokiwave AWMF-0117 silicon beamforming chip was used for this design, with operation between 10.5 GHz to 16 GHz. The chip is a single channel beamformer that is half-duplexed with a T/R switch to support both receive (Rx) and transmit (Tx), and also supports dual polarization through a polarization switch. The chip has a noise figure (NF) of 3 dB with a output 1 dB compression point of 12 dBm. The chip has 6-bits of phase control and 6-bits of amplitude control and consumes approximately 200 mW on Rx and 250 mW on Tx.

Figure 11:
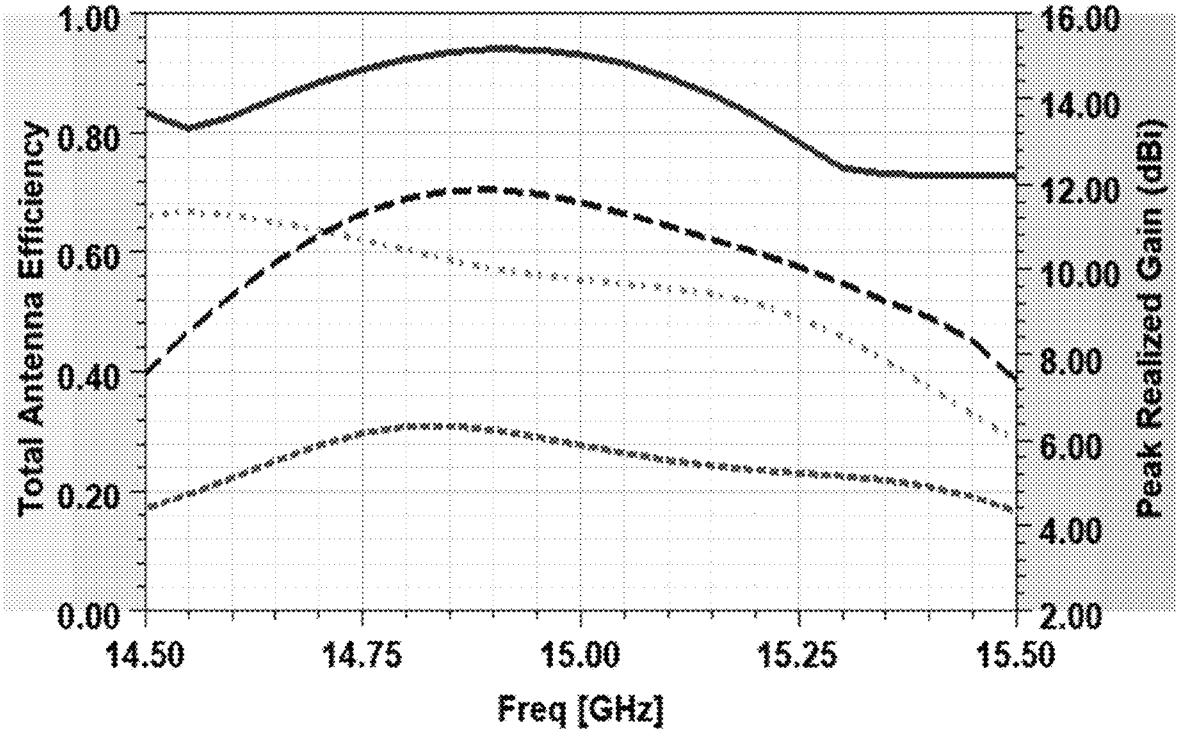
FIG. 11 is a plot of the frequency (X-axis, labeled "Freq [GHz]") vs. the total antenna efficiency (Y-axis, labeled "Total Antenna Efficiency") that shows the peak realized gain and the total antenna efficiency of the 1×16 linear phased array antenna.

Finite array simulations were also conducted to assess the performance as well as the proposed technique. The simulation resulted in a common impedance matching ($S_{11}$≤−10 dB) bandwidth between 14.46 GHz to 15.19 GHz. FIG. 11 shows the peak realized gain and total antenna efficiency for the 16-element linear array at the broadside angle. The $TM_{11}$ mode had a total antenna efficiency above 60% for 14.5 GHz to 14.81 GHz and a total antenna efficiency above 50% for the remaining matching bandwidth. This resulted in a peak realized gain of 15.15 dBi at 14.9 GHz and a peak realized gain better than 13.7 dBi for the remaining matching bandwidth. The $TM_{21}$ mode has a total antenna efficiency above 20% from 14.5 GHz to 15.19 GHz. This resulted in a peak realized gain of 14.86 dBi at 14.90 GHz and a realized gain better than 10.5 dBi for 14.65 GHz to 15.19 GHz.

Figure 12:
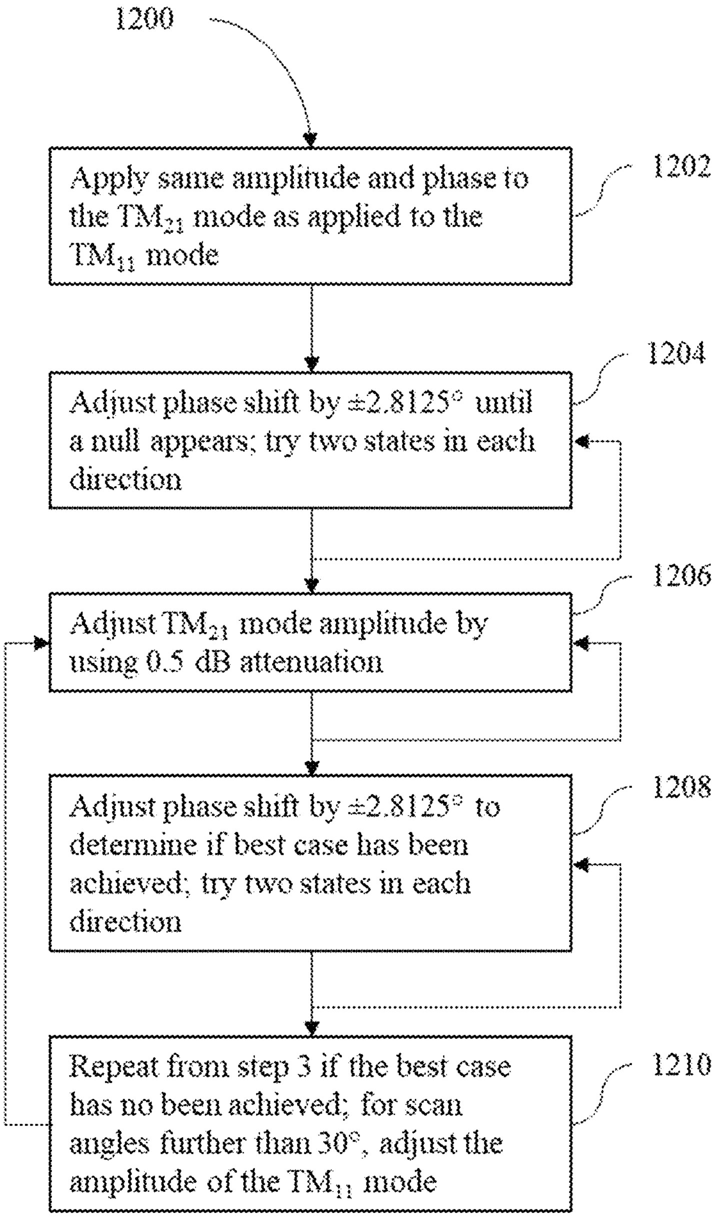
FIG. 12 is a flow diagram of a beamforming method to achieve grating lobe suppression.

In order to suppress the grating lobe, a process described in FIG. 12 was followed, which resulted in considerable lowering of the grating lobe introduced by the $TM_{11}$ mode patch due to the chosen 1λ inter-element spacing. In this procedure, discrete digital phase shifts and gain attenuation were considered in order to emulate physical realization of the prototype.

Grating lobe suppression, for the 16-element linear array, at the design frequency of 15 GHz was taken at 15°, 30°, and 45° beam scan positions. For each case, the amplitude, phase, and frequency are listed below in Table 1. The full peak to null suppression and sidelobe (SLL) is also included for each case. As can be seen up to 28 dB of grating lobe suppression can be achieved, at wide scan angles, using a dual-mode approach.

TABLE 1

Grating Lobe Suppression at Center Frequency using Chosen Amplitude and Phase Combinations.

| Beam Scan Position (°) | $TM_{11}$ Attenuation (dB) | $TM_{21}$ Attenuation (dB) | Phase Shift (°) | SLL (dB) | Peak to Null (dB) |
|---|---|---|---|---|---|
| 15 | 0 | 0 | 90 | 12.5 | 15 |
| 30 | 0 | −1.5 | 180 | 17 | 16.7 |
| 45 | −2 | 0 | 255 | 14 | 19.95 |

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of a list should be construed as a de facto equivalent of any other member of the same list merely based on their presentation in a common group without indications to the contrary.

Unless otherwise stated, any feature described herein can be combined with any aspect or any other feature described herein.

Reference throughout the specification to "one example", "another example", "an example", means that a particular element (e.g., feature, structure, and/or characteristic) described in connection with the example is included in at least one example described herein, and may or may not be present in other examples. In addition, the described elements for any example may be combined in any suitable manner in the various examples unless the context clearly dictates otherwise.

The ranges provided herein include the stated range and any value or sub-range within the stated range. For example, a range from about 0 dB to about 30 dB should be interpreted to include not only the explicitly recited limits of from about 0 dB to about 30 dB, but also to include individual values, such as 3 dB, 17 dB, 23.5 dB, etc., and sub-ranges, such as from about 5 dB to about 15 dB, etc.

In describing and claiming the examples disclosed herein, the singular forms "a", "an", and "the" include plural referents unless the context clearly dictates otherwise.

What is claimed is:

1. An antenna system, comprising:

a multi-mode antenna having a plurality of radiating elements, wherein the radiating elements have an inter-element spacing of 12 and can radiate in a dominant mode and an auxiliary mode where 2 is a wavelength of an operating frequency band of the multi-mode antenna;

a beamformer, wherein the beamformer is integrated with a multi-chip module;

an indium phosphate (InP) low noise amplifier;

a gallium nitride (GaN) high power amplifier; and wherein the multi-mode antenna suppresses grating lobes by:

i) applying an identical amplitude and phase to the dominant mode and auxiliary mode;

ii) adjusting a phase shift until the null appears;

iii) adjusting the auxiliary mode amplitude by using a 0.5 dB attenuation; and iv) repeating ii) and iii) until equal to or less than 30 dB of cancellation been achieved.

2. The system of claim 1, wherein the multi-mode antenna is a co-located antenna selected from the group consisting of a phased array antenna, a 2D planar array antenna, or a triangular lattice antenna and the dominant mode is a $TM_{11}$ mode and the auxiliary mode is a $TM_{21}$ mode.

3. The system of claim 1, wherein the multi-mode antenna is a tapered slot antenna and the dominant mode is a differential mode and the auxiliary mode is a common mode.

4. The system of claim 1, wherein the multi-mode antenna is a phased array antenna is a 16-element linear phased array antenna.

5. The system of claim 1, wherein the dominant mode produces a beam and grating lobes and the auxiliary mode produces a null that cancels the grating lobes.

6. The system of claim 2, wherein the co-located antenna includes both antennas on a single metal substrate.

7. The system of claim 1, wherein the beamformer is a silicon germanium beamformer integrated with a multi-chip module.

8. An antenna system, comprising:

a multi-mode antenna having a plurality of radiating elements, wherein the radiating elements have an inter-element spacing of 12 and can radiate in a dominant mode and an auxiliary mode where 2 is a wavelength of an operating frequency band of the multi-mode antenna;

a beamformer, wherein the beamformer is integrated with a multi-chip module;

a gallium nitride (GaN) high power amplifier; and wherein the multi-mode antenna suppresses grating lobes by:

i) applying an identical amplitude and phase to the dominant mode and auxiliary mode;

ii) adjusting a phase shift until the null appears;

iii) adjusting the auxiliary mode amplitude by using a 0.5 dB attenuation; and iv) repeating ii) and iii) until equal to or less than 30 dB of cancellation been achieved.

* * * * *